April 1, 1941.  N. B. STONE  2,237,201

TIRE RIM TOOL

Filed Aug. 10, 1939

Inventor
N. B. Stone

By A. D. Adams
Attorney

Patented Apr. 1, 1941

2,237,201

UNITED STATES PATENT OFFICE 2,237,201

TIRE RIM TOOL

Nathaniel B. Stone, Riverdale, Md.

Application August 10, 1939, Serial No. 289,496

6 Claims. (Cl. 157—1)

This invention relates to tools, more particularly to expanding and contracting tools and aims, among other objects, to provide an improved tool to facilitate removal and replacement of split rim flanges. The tool is especially adapted for use with the rim shown and described in copending application Ser. No. 214,997, filed June 21, 1938.

Figure 1:
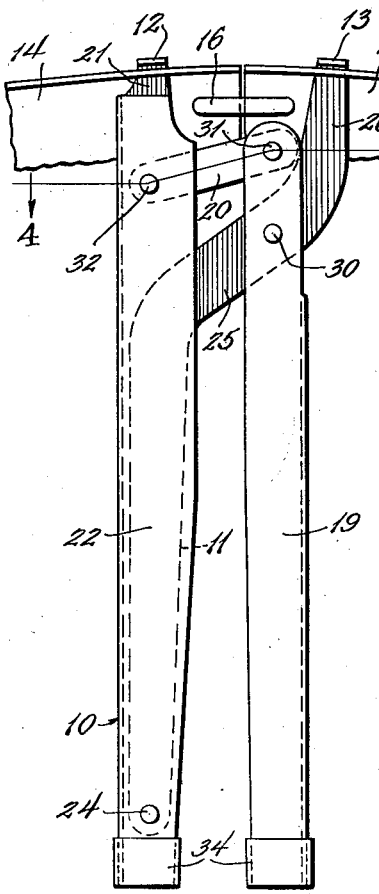
Fig. 1 is a plan view of a rim tool embodying the invention and shown applied to a split rim flange in closed position.
Figure 2:
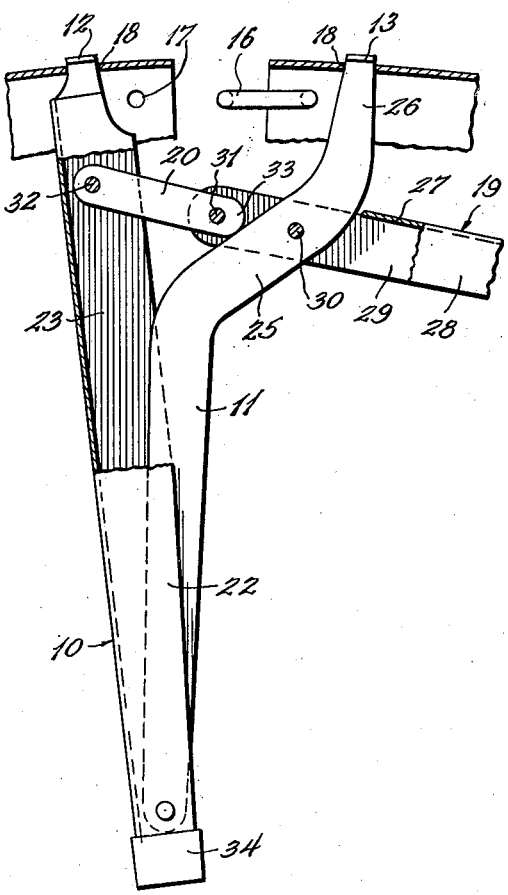
Fig. 2 is a similar view partly in section but showing the tool and flange in expanded position.
Figure 3:
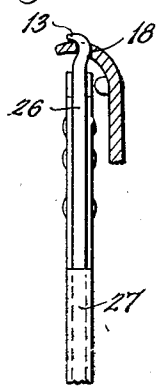
Fig. 3 is a fragmentary side elevation of the tool shown in Fig. 1.
Figure 4:
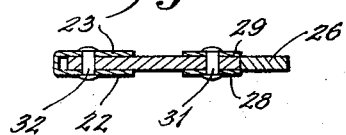
Fig. 4 is a sectional view taken on the line 4—4 of Fig. 1.

Referring particularly to the drawing, the preferred embodiment of the invention is there shown as comprising a pair of arms 10 and 11 pivotally connected together at their lower ends and having terminal hooks 12 and 13 at their upper ends adapted to engage the adjacent ends 14 and 15 of a rim flange to expand or contract the same.

As shown in said copending application, the rim flange is used in connection with a wheel rim to hold a pneumatic tire on the rim when the flange is locked closed on the rim. When it is desired to remove a tire, it is first necessary to remove the split flange by unlocking and expanding it. When replacing the flange, it is necessary to draw the ends together tightly so that it may be locked. The flange is adapted to be held in locked position by a releasable self-locking latch indicated at 16 secured to one end portion 15 and engageable with an aperture 17 in the other end portion 14. The flange end portions 14 and 15 have openings 18 in their laterally bent upper edges in which the hook members 12 and 13 are adapted to be engaged. When the hooks are engaged with the openings 18 and the arms are swung away from each other, the flange ends will be separated and when the arms are swung toward each other, the flange ends will be brought together.

The arm 10 is shown as being in the form of a handle and a second handle or actuating lever 19 is pivotally connected directly to the arm 11 and also to the arm 10 through a toggle link 20, the arrangement being such that when the handles are separated, the hooks will be separated and vice versa.

The handles are preferably made of relatively strong sheet metal bent longitudinally into U or channel shape and having their open sides facing each other.

The hook member 12 is shown as being carried by an extension 21 on the upper end of the handle 10. The extension may be secured between the front and rear walls 22 and 23 of the handle 10 by rivets, welding or the like or it may be formed integral with the handle by bending the walls 22 and 23 together and cutting them to the proper shape to form the hook members 12. The hook member 13 is shown as being formed integral with upper end of the arm 11, the lower end of which is mounted in the channel handle 10 between the front and rear walls 22 and 23 thereof and connected thereto by a pivot pin 24 in the lower end of the handle 10. The arm 11 normally has the major portion of its length recessed in the handle 10. It is bent laterally near its upper end to form an intermediate fulcrum portion 25 and then upwardly to form an offset end portion 26 to which the hook 13 is integrally connected.

The handle 19, which has been stated is channel-shaped in cross section, has the upper portion of its web 27 slotted to permit the upper portions of the front and rear walls 28 and 29 thereof to straddle the fulcrum portion 25 and the walls 28 and 29 near the upper end of the handle 19 and the link 20 is connected at one end to the upper end of the handle 19 by a pin 31 and at the other end to the handle 10 by a pin 32 below the extension 21. The ends of the link 20 are arranged between the front and rear walls of each handle so that there is no twisting or side strain placed on the pivots.

When the tool is in a normal position, the handles are substantially parallel and are prevented from contacting due to the end 33 of the link 20 between the walls 28 and 29 abutting the offset portion 26 of the arm 11. In use, the tool is held in substantially horizontal position with the hooks up. The handles are separated slightly when the hooks 12 and 13 may be inserted in the openings 18 and the handles then lowered to depending position as shown in Fig. 1. The handles are then squeezed together to close the gap between the ends 14 and 15 of the flange so that the latch 16 may be released. In this connection, it will be observed that the latch 16 is readily accessible as it is above the link 20 and between the extension 21 and offset 26. After the latch is released, the handles are swung apart until the end 33 of link 20 strikes the upper edge of the fulcrum portion 25. The tool will then be locked in open position because the pivot 31 has passed below dead center with respect to pivots 30 and 32. The flange will thus positively be held in open position while it is being removed and replaced on the rim. When the flange is returned to the rim it is necessary to draw the ends closely together so that the latch will automatically lock. The hooks 12 and 13 may then be easily removed from the openings 18.

To prevent the hands from slipping off the handles 10 and 19 during operation of the tool, the lower ends of said handles are provided with ferrules 34 which are slightly larger than the handle ends.

It is to be noted that the lower ends of the handles 10 and 19 are on the same plane and that the distance between the pivots 24 and 30 is much greater than the distance between pivots 30 and 31 so that a great mechanical advantage is obtained. Very little exertion is necessary to expand or contract the rim flange. Also, as the lower major portion of the arm 11 is housed within the channel handle 10 when in closed position and partially housed in it when in open position, there is no danger of injuring the hands.

From the foregoing description, it will be seen that the tool is extremely simple in its construction yet positive in its action to expand or contract a rim flange. It is very rugged and can be made at a very low cost and requires very little storage space when contracted.

Obviously, the present invention is not restricted to the particular embodiment thereof herein shown and described.

What is claimed is:

1. A rim tool comprising, in combination, a pair of arms pivotally connected together near their lower ends and having rim engaging means at their upper ends; one of said arms being substantially straight and channel shaped in cross section and constituting a handle, the other arm being substantially straight throughout the major portion of its length and having an offset portion at the upper end said major portion being housed within the channel shaped arm; an actuating handle pivotally connected near its upper end to the intermediate portion of said offset arm; and a toggle link pivotally connected to the upper end of said actuating handle and to said other handle below its upper end.

2. A rim tool comprising, in combination, an arm having a longitudinal channel in one side; a second arm having its lower major portion normally housed in said channel and pivotally connected at its lower end to the lower portion of the channelled arm, said arm having an offset portion near its upper end, both arms having rim engaging means on their upper ends; an actuating handle having a bifurcated upper portion straddling the offset arm and pivotally connected thereto near its upper end; and a toggle link pivotally connected between the upper end of said actuating handle and said channelled arm.

3. A rim tool comprising, in combination, a substantially straight channel shaped arm and constituting a handle; a flat arm pivotally connected at its lower end to the lower portion of the channel shaped arm and having the lower major portion of its length normally housed within the channel shaped arm, said flat arm also having an offset upper end portion; means on the upper ends of both arms to engage a rim; a channel shaped actuating handle normally substantially parallel to said channel shaped arm, with the open sides of said channels facing each other; the upper portion of said actuating handle having its web slotted and the opposite sides thereof straddling said offset portion near its upper end and being pivotally connected thereto at the point of intersection; and a toggle link having its ends housed within the upper end of said actuating handle and the upper portion of said channel shaped arm and pivotally connected thereto.

4. A tool for expanding and contracting split tire rims comprising, in combination, a channel shaped arm open on the inside and constituting a handle; a flat arm having its lower portion normally housed within and pivotally connected to said channel shaped arm, said flat arm being bent outwardly intermediate its ends forming a fulcrum portion and then upwardly forming an offset upper portion; rim engaging means carried by the upper ends of both arms; an actuating handle normally substantially parallel with the channel shaped arm and having a bifurcated upper portion straddling said fulcrum portion and pivotally connected thereto; and a toggle link pivotally connected at one end to the actuating handle above said fulcrum portion and at the other end to said channel shaped arm whereby when the said channel shaped arm and said actuating handle are swung away from each other the rim engaging means will be separated.

5. A rim tool comprising, in combination, a pair of arms pivotally connected together near their lower ends and having rim engaging means at their upper ends, one of said arms being channel shaped in cross section and the other of said arms being flat and having its major portion housed within the channel shaped arm; an actuating handle pivotally connected near its upper end to the intermediate portion of said flat arm; a toggle link pivotally connected at one end to the upper end of said actuating handle and at the other end to the intermediate portion of said channel shaped arm; and means to limit the closing movement of said arms.

6. A rim tool comprising, in combination, a pair of arms pivotally connected together near their lower ends and having rim engaging means at their upper ends, one of said arms being channel shaped in cross section and the other of said arms being flat and having its major portion housed within the channel shaped arm; an actuating handle pivotally connected near its upper end to the intermediate portion of said flat arm; a toggle link pivotally connected at one end to the upper end of said actuating handle and at the other end to the intermediate portion of said channel shaped arm; and means on said link cooperating with said flat arm when the tool is in expanded position to prevent accidental contraction thereof.

NATHANIEL B. STONE.